Nov. 23, 1948. N. P. STOATE 2,454,412
INSPECTION APPARATUS FOR TRANSPARENT VESSELS
Filed Sept. 14, 1945 4 Sheets-Sheet 1

INVENTOR
NORMAN PARKER STOATE
BY
ATTORNEY

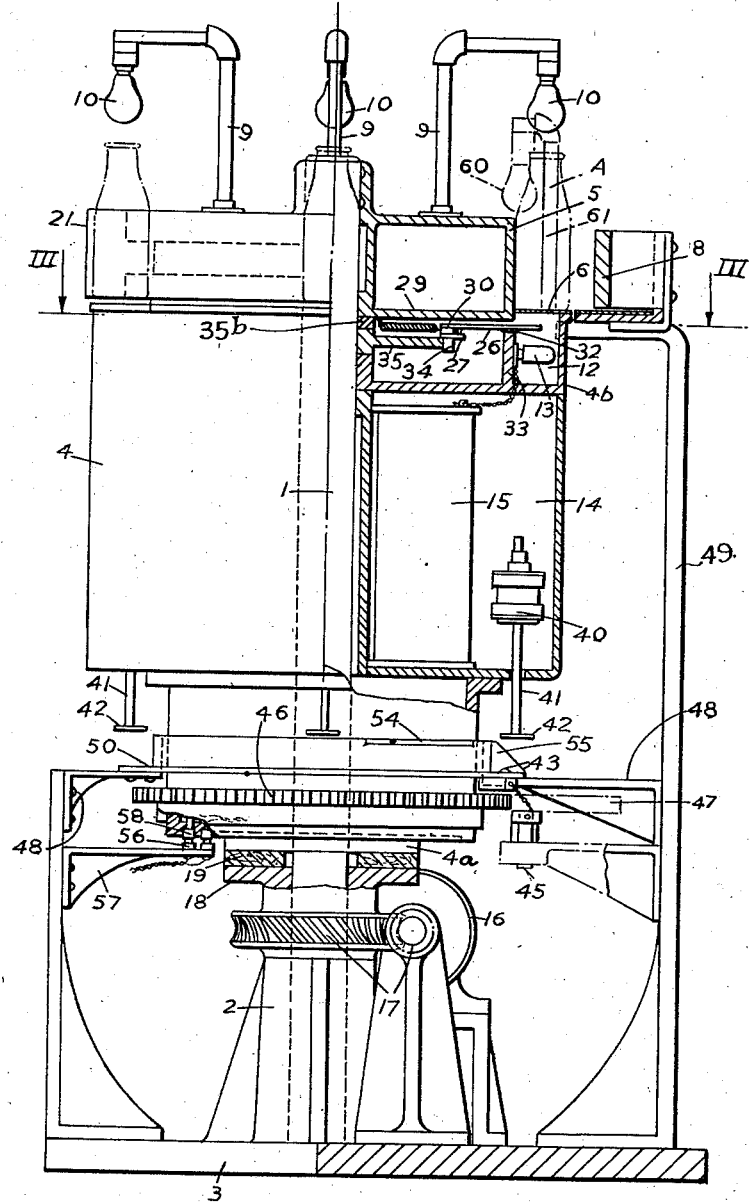

Nov. 23, 1948.　　　　N. P. STOATE　　　　2,454,412
INSPECTION APPARATUS FOR TRANSPARENT VESSELS
Filed Sept. 14, 1945　　　　　　　　　　　　　4 Sheets-Sheet 3

INVENTOR
NORMAN PARKER STOATE
BY
ATTORNEY

Nov. 23, 1948.  N. P. STOATE  2,454,412
INSPECTION APPARATUS FOR TRANSPARENT VESSELS
Filed Sept. 14, 1945  4 Sheets-Sheet 4
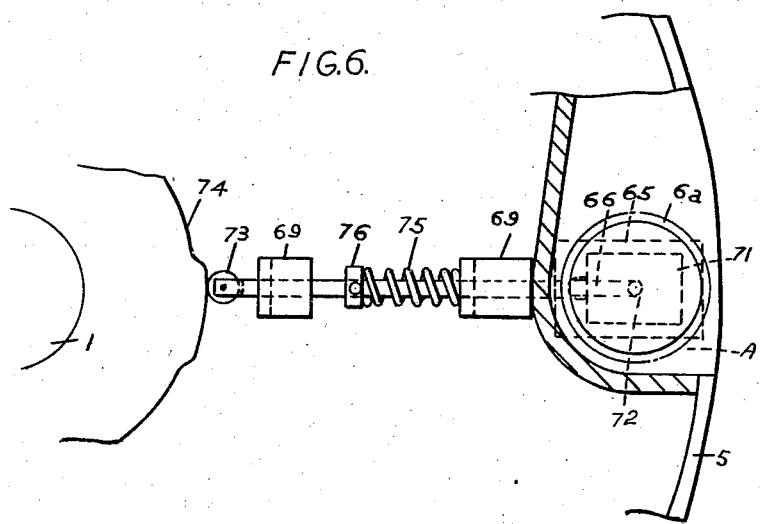
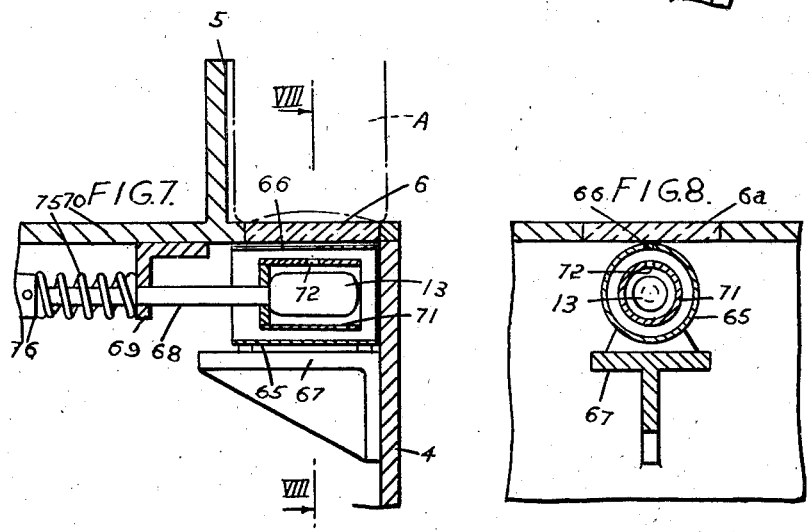
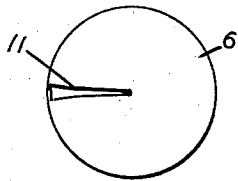
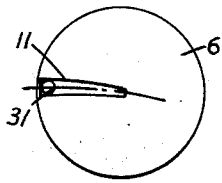
INVENTOR
NORMAN PARKER STOATE
BY
ATTORNEY Patented Nov. 23, 1948

2,454,412

UNITED STATES PATENT OFFICE 2,454,412

INSPECTION APPARATUS FOR TRANSPARENT VESSELS

Norman Parker Stoate, Hampstead Garden Suburb, London, England, assignor to United Dairies Limited, London, England, a British company Application September 14, 1945, Serial No. 616,301
In Great Britain September 19, 1944

8 Claims. (Cl. 250—41.5)

This invention relates to apparatus for scanning the bottom of a transparent vessel to detect foreign particles thereon, by means of light directed longitudinally through the mouth and bottom of the vessel on to a photo-electric device.

An object of the invention is to provide an improved construction of such scanning apparatus and a further object is to provide means for compensating for variations in the light transmission value of the vessel bottom, due for example, to convexity or concavity thereof.

Yet another object is to provide a construction which will enable substantially the same minimum size of foreign body to be detected anywhere on the bottom of the vessel.

According to the present invention apparatus of the above kind is characterised by the combination with the source of light and the photoelectric device, of means for locating a vessel to be scanned between the source of light and the photo-electric device, a scanning device disposed between the source of light and the photo-electric device, and means for rotating the vessel about its longitudinal axis relatively to said scanning device, said scanning device comprising a first screen provided with an aperture having an area small relative to that of the bottom of the vessel, and a second screen provided with a slit which is disposed substantially radially of the vessel bottom, the width of said slit being at least equal to the width of said aperture, and means for moving said first screen relatively to said second screen so as to traverse the aperture along the slit as the vessel rotates.

The rate of travel of the apertured screen in relation to the speed of rotation of the vessel depends on the size of the aperture, for example if the aperture is circular and has a diameter equal to one eighth of that of the inside of the vessel, then the rate of travel of the apertured screen, must be slow enough to permit the vessel to make at least four revolutions while the aperture is travelling from one end of the slit to the other so as to scan the entire surface of the bottom of the vessel.

The movement of the apertured screen need not be continuous, but may be effected in steps, the extent of movement at each step being not greater than the diameter of the smallest particle it is desired to detect.

Preferably the photo-electric device is in the form of a photo-electric cell mounted for movement with the apertured screen whereby the light passing through the aperture in said screen always falls on the same area of the cell cathode.

By this means variations in the sensitivity of the apparatus due to possible variations in the sensitivity of different areas of the cathode are obviated.

In a convenient form of the invention the apertured screen may be in the form of a tube surrounding the photo-electric cell and the screen having the slit may be in the form of a second tube surrounding said apertured tube.

According to a further feature of the invention the slit in the second screen may be shaped to compensate for variation in the light transmission value of the vessel bottom due for example to convexity of said bottom and to this end the slit may have a width which varies along its length in accordance with variations in the light transmission value of the bottom of said vessel from the centre to the periphery thereof, the maximum width of said slit being at least equal to the width of the aperture in the first screen.

By this means the effective width of the aperture is varied as it travels along the slit to compensate for variations in the light transmission value of the vessel bottom.

In the case of vessels having an internally convex bottom, in which due to the convexity, the light transmission value varies from a maximum at the centre to a minimum at the periphery, the width of the slit may vary from a minimum at the centre to a maximum at the periphery, and conversely if internally concave vessel bottoms are to be scanned.

The aperture in the first screen is preferably circular, but may be, for example, oval or square.

In order that the invention may be more fully understood two embodiments thereof will now be described by way of example with reference to the accompanying diagrammatic drawings in which:

Fig. 2 is an elevation partly in section on the line II—II of Fig. 1;

Fig. 6 is a plan to an enlarged scale of the scanning mechanism employed in the embodiment shown in Figs. 4 and 5;

Fig. 7 is a vertical section through said scanning mechanism,

Fig. 8 is a section on the line VIII—VIII of Fig. 7, and

Figs. 9 and 10 illustrate modifications.

Figure 1:
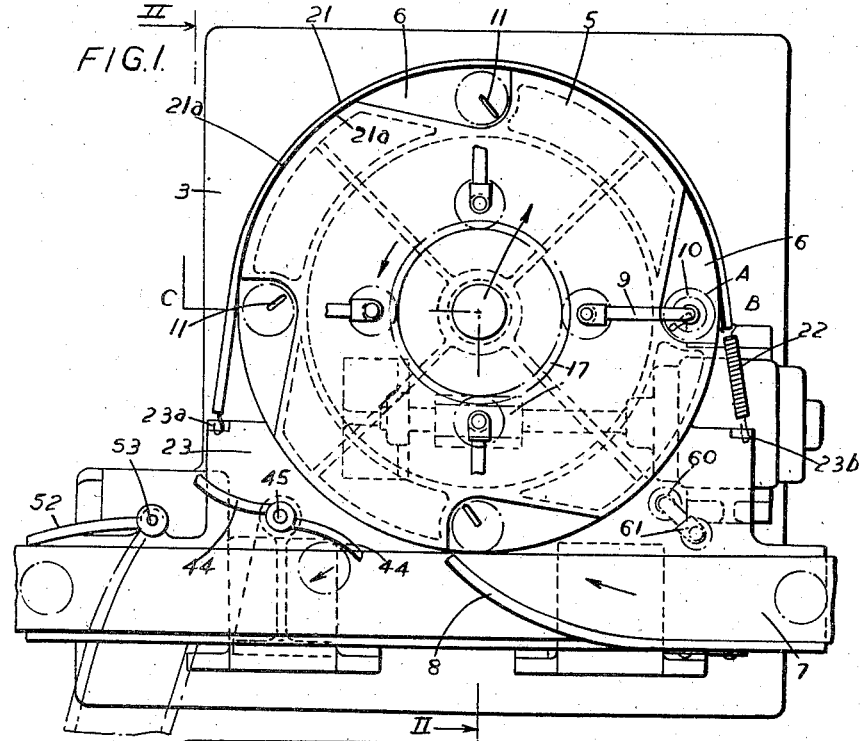
Fig. 1 shows one construction according to the invention, in plan.
Figure 3:
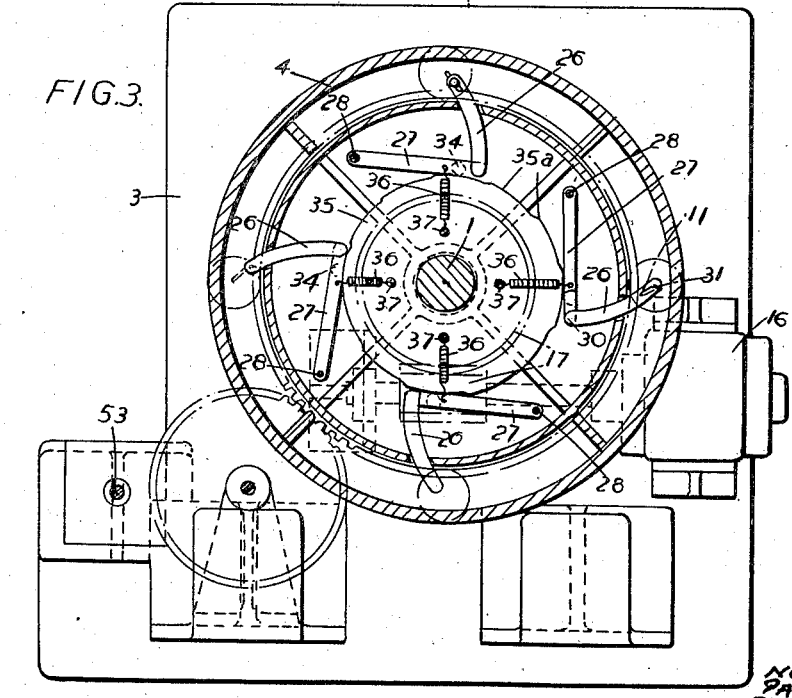
Fig. 3 is a sectional plan on the line III—III of Fig. 2.
Figure 4:
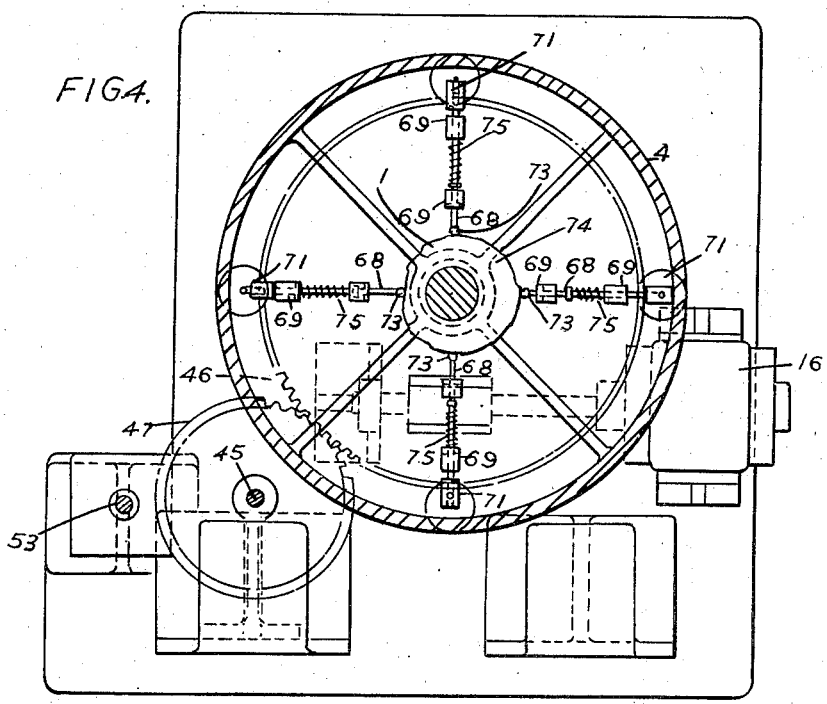
Fig. 4 is a sectional plan, similar to Fig. 3, of another embodiment of the invention, being a section on the line IV—IV of Fig. 5.
Figure 5:
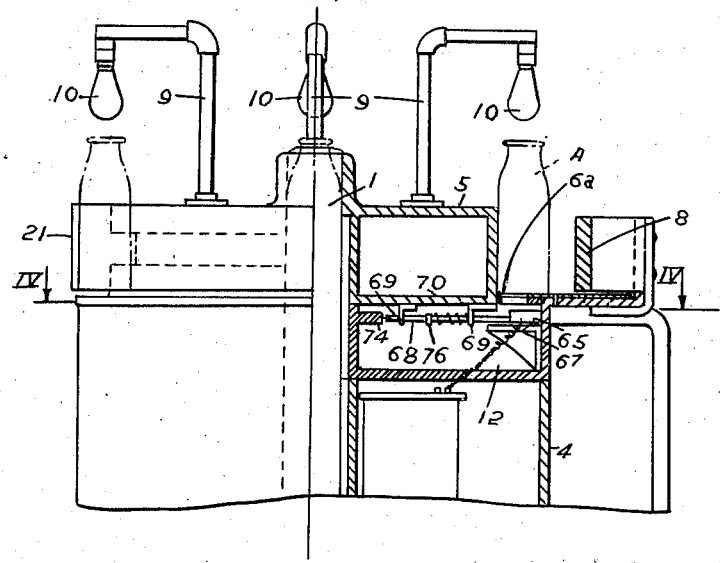
Fig. 5 is an elevation, partly in section, of the upper part of said other embodiment, of which the lower part is constructed in the manner shown in Fig. 2.

In the construction illustrated in Figs. 1 to 3 the apparatus comprises a vertical central shaft 1 fixed in a support 2 carried by a base plate 3.

Rotatably mounted on the shaft 1 is a casing 4 on the upper part of which is carried a head 5 comprising four platforms 6 to receive the bottles.

The bottles are fed to the rotating head 5 by a conveyor band 7 which may be driven by any known means, a guide 8 being provided to feed the bottles on to the platforms 6; the head being recessed at each platform as shown in order to locate a bottle on the platform.

Depending from a fixed support 9 adjacent each platform 6 is a lamp 10 which is disposed immediately above the centre of the respective platform 6 and at a height above it sufficient to permit the insertion of a bottle on the platform below the lamp, so that the light from the lamp passes longitudinally through the mouth and bottom of the bottle on the platform.

Formed in each platform is a narrow slit 11 in the form of an arc passing through the longitudinal axis of the bottle when the latter is in scanning position on the platform 6, and below each platform 6 there is formed within a portion 4b of the casing 4 a chamber 12 within which is housed a photocell 13.

There is a chamber 12 containing a photocell 13 below each platform 6 and, below the chambers 12, the casing 4 is divided into four compartments 14 which serve to house the amplifiers for the photocells, one of said amplifiers being shown diagrammatically at 15 in Fig. 2. The lamps 10 may be shaded to prevent light from one lamp affecting the cell associated with another.

The casing 4 is rotated by an electric motor 16 which, through worm gear 17 drives a clutch element 18 freely mounted on the shaft 1. The casing 4 rests freely on a friction disc 19 disposed between the bottom 4a of the casing 4 and the clutch element 18, the weight of the casing being sufficient to provide an effective friction grip and consequent driving of the casing from the motor.

Connected at one end to a lug 23a on a fixed frame member 23 is a belt 21 of flexible but inextensible material, e. g. canvas, the inside of which is lined with a friction material such as rubber. The other end of said belt is connected by a spring 22 to another fixed lug 23b so that the belt embraces the head 5.

As the casing 4 rotates and carries the bottles around, the external wall of each bottle engages the lining of the belt 21 whereby the bottles are rotated about their longitudinal axes on the platforms 6 as they travel around bodily with the head 5.

Cooperating with each slit 11 is a moving screen 26 carried by an arm 27 pivoted at 28 to the underside of the floor 29 of the head 5, the screen being spaced above the arm 27 by a spacer 30. The screen 26 is provided with a circular scanning aperture 31 and extends through a light-proof slot 32 in the wall 33 of chamber 12 so as to pass between the platform 6 and the photocell.

The centre line of slit 11 is disposed along an arc having its centre coincident with the centre of the pivot 28 for the arm 27 and the scanning aperture 31 is disposed on this arc, the aperture 31 being of a diameter equal to the width of the slit 11. Accordingly by rocking the arm 27 back and forth about pivot 28 the aperture 31 is caused to travel to and fro underneath the slit 11 from one end thereof to the other.

In order thus to rock the arm 27, said arm carries a roller 34 urged into contact with a fixed cam 35 by a spring 36 anchored by a pin 37 to the underside of the floor 29 of the head 5. The cam 35 is common to all the arms 27 and is fixed to the stationary shaft 1, the innermost wall 38 of the casing portion 4b being reduced in height to admit the cam 35, and a spacing ring 35b being disposed around the shaft 1 above the cam.

The cam 35 is formed with a number of concentric steps 35a so arranged that when a platform 6 is in the position indicated at B in Fig. 1 the aperture 31 in screen 26 is below the centre of a bottle A on said platform. As the casing 4 rotates counterclockwise in Fig. 1 the roller 34 passes round the periphery of cam 35 of which the steps 35a progressively decrease in radius until the platform 6 approaches the position C in which the roller 34 is on the step 35a of smallest radius.

During this movement of the casing 4, the arm 27, under the action of spring 36, rocks progressively clockwise about its pivot 28, as the roller 34 reaches the successive steps 35a of cam 35, with the result that the screen 26 is moved from the position shown at the right hand of Fig. 3 in which its aperture 31 is below the centre of the bottle A to the position shown at the left hand of Fig. 3 in which its aperture is below the periphery of the bottom of the bottle. During this movement of the screen the bottle will have performed several revolutions about its longitudinal axis owing to its engagement with the belt 21.

When the bottle is on the platform 6 light from the lamp 10 which is above the bottle will pass longitudinally through the mouth of the bottle, through the slit 11 in the platform which acts as a fixed screen and through the aperture 31 in the moving screen 26 on to the photocell 13. Accordingly if the bottle were to remain stationary the traversing of the aperture 31 along the slit 11 would effect scanning of a curved strip of the bottom of the bottle. Since however the engagement of the bottle with the belt 21 during rotation of the head 5 causes rotation of the bottle about its own axis the entire surface of the bottom of the bottle is thoroughly scanned during the period in which the bottle is carried round with the rotating head 5.

As the centrifugal force due to the rotation of the bottle tends to cause any particle within the bottle to move to the periphery thereof, it is preferred to start the scanning operation at the centre of the bottom of the bottle and to move the screen so that the aperture in the screen moves along the slit in the support from the centre outwardly towards the periphery. If this were not done a particle initially at the centre might fly to the periphery after the peripheral area had been scanned and before the centre had been scanned, so that this particle might escape the scanning operation altogether in which case it would remain undetected.

Accordingly the shape of the cam 35 is such that when the bottle first begins to rotate about its axis the aperture 31 in the moving screen 26 is at the centre of the bottom of the bottle and during the rotation of the bottle the screen 26 moves to traverse the aperture 31 along the slit 11 from the centre to the periphery of the bottom of the bottle.

Each photocell is arranged to control an electric circuit in such a way that if the intensity of the light falling on the cell is reduced below the predetermined value the change in the current flowing in the circuit operates a device to give an indication of the presence of a foreign body in the bottle.

To this end the photocell controls through the amplifier 15 a magnet 40 of which the armature is in the form of a trip rod 41 carrying at its lower end an insulated contact disc 42.

The magnet 40 is normally energised and is de-energised when the light falling on the photocell is reduced due to a foreign body. When the magnet thus becomes de-energised the trip rod 41 drops and connects a pair of contacts 43 by means of its disc 42.

As already mentioned the head 5 rotates about the shaft 1 and during this rotation the bottles rotate about their axes whereby the bottom of each bottle is scanned by means of the moving screen 26 and slot 11.

If, during this scanning operation, a foreign body is present in a bottle, this body, on passing over the slit 11 at a time when the aperture 31 is in register with the body will reduce the light falling on the photocell 13, and the current flowing through the amplifier 15 will be increased. This increased current opens the contacts of a relay, as will be explained later, whereby the current supply to the magnet 40 is cut off and the trip rod 41 is allowed to fall.

The fall of the trip rod is utilised to eject the defective bottle and the means for effecting this operation will now be described.

The bottles are discharged from the head 5 on to the conveyor band 7, by means of rotating fingers 44 which act alternately, being secured to a shaft 45 which is driven at a speed relative to that of the casing such that the bottle when impelled by one of the fingers 44 travels faster than when impelled by the head. This shaft 45 is rotated by means of gear teeth 46 cut on the lower part of the casing 4, which teeth engage with a gear wheel 47 secured to the shaft 45 (see Fig. 2).

Mounted on brackets 48 secured to standards 49 rising from the base plate 3 is a fixed ring 50 carrying the pair of insulated contacts 43 which are connected to apparatus for releasing a guide 52 for ejecting the defective bottle from the band 7 after said bottle has been discharged from the head on to said band.

This guide 52 is secured to a shaft 53 and is normally latched out of the path of the bottles as they pass along on the band, a magnet for releasing the latch being energised when the contacts 43 are bridged by the trip rod disc 42. When the latch is released a spring pulls the guide 52 into the path of the bottles so that the defective bottle is guided off the band on to a receiving platform.

It will be understood that a bottle in which no foreign body has been detected will, in passing off the platform 6, tend to release the trip rod 41, since the walls of the bottle in passing over the aperture 31 will reduce the light reaching the photocell 13.

In order to obviate this incorrect release of the trip rod 41, a guard plate 54 is provided above the ring 50, this plate 54 being disposed so that its upper surface is just level with the under surface of the disc 42 on the trip rod 41 when the latter is in its raised position. When the magnet 40 is de-energised due to the bottle walls passing over the aperture 31, the trip rod 41 is prevented from dropping by the guard plate 54.

If, however, the magnet has already been de-energised due to a foreign body in the bottle passing over the aperture 31, the trip rod 41 will have dropped until arrested by its disc 42 engaging the ring 50. The disc 42 will therefore pass round under the guard plate 54 and will bridge the contacts 43, thereby releasing the ejector finger or guide 52, by means of a relay (not shown).

The contacts 43 must be placed so as to give the necessary delay in the release of the guide 52, which release must occur after the preceding bottle has passed the position which the guide occupies when released, but before the bottle to be ejected has reached a position in which it would be struck by the guide during the movement of the latter.

In order to reset the trip rod 41 into its upper position after it has been released, a ramp 55 is provided on the ring 50. Conveniently this ramp 55 is placed so as to be engaged by the disc 42 on the trip rod just after a bottle has arrived on the associated platform 6. By this means the trip 41 is reset after having been released either by a foreign body in the bottle which was previously on the platform 6, or by the passing of the walls of the next following bottle over the aperture 31 while said following bottle was passing on to the platform.

Current is supplied to the electrical circuits of the apparatus through brushes 56 secured to a fixed bracket 57 and engaging with slip rings 58 secured to the underside of the lower portion of the casing 4.

In some cases it has been found that the mere restoration of normal illumination after the particle has passed over the aperture 31 is insufficient to reduce the current in the photocell circuit sufficiently to open the relay, with the result that the magnet 40 remains de-energised and releases the trip rod 41 again immediately after it has been reset. In order to overcome this difficulty means may be provided for increasing the illumination of the bottom of the bottle while the trip rod 41 is in the region of the resetting device.

Such means for increasing the illumination may comprise a supplemental lamp 60 supported on a fixed standard 61 adjacent the rotating head 5 and positioned to direct its light on to the platforms 6 as they pass. This lamp 60 is also positioned between the contacts 43 which are closed by the disc 42 to initiate actuation of the bottle ejecting mechanism and the ramp 55 for resetting the trip rod 41.

After the platform 6 has passed beyond the region illuminated by the supplemental lamp 60 the disc 42 engages the ramp 55 as already described, and, since now the magnet 40 is re-energised, the rod 41 is raised and held in its uppermost position.

In a modified construction shown in Figs. 4 to 8 the platform 6a is made of clear glass and below the platform there is formed within the casing 4 a compartment 12a within which is mounted a fixed screen 65 in the form of a hollow cylinder having a slit 66 formed in its upper surface and so positioned as to be radial of the bottom of a bottle when in scanning position on the glass platform 6a. The cylindrical screen 65 is supported on a shelf 67 secured to the wall of the rotating casing 4.

The photocell 13 is mounted on the end of a rod 68 which is mounted to reciprocate in guides 69 fixed to the underside of a part 70 of the head which is in the plane of the glass platform 6a. This rod 68 also carries a moving screen in the form of a cylinder 71 surrounding the photocell 13 and having an aperture 72 formed therein to register with the slot 66.

The inner end of the rod 68 carries a roller 73 maintained in engagement with a fixed cam 74 by means of a spring 75 surrounding the rod 68 between one of the guides 69 and a collar 76 fixed to the shaft.

The cam 74 is stepped similarly to the cam 35 already described and, as the head rotates, the cam 74 causes the rod 68 to move in and out whereby the aperture 72, with the photocell 13 is moved along the slot 66 in the fixed screen 65 from the centre to the periphery of the bottle as the latter rotates.

This construction has the advantage that the light reaching the photocell 13 through the aperture 72 always falls on the same area of the cell cathode.

The source of light may be positioned above the vessel and the light sensitive device below the vessel as shown in the drawings, or vice versa.

The relay above referred to is connected to the amplifier 15 in such a way that an increase in current through the amplifier opens the relay contacts, which contacts are in the circuit of the magnet 40 so that the said increase in current breaks the magnet circuit and de-energises it. On a reduction in the current through the amplifier to its normal value the relay contacts close thereby establishing the magnet circuit again.

Owing to the convexity of the bottom of the bottle more light is required to prevent operation of the photocell when the aperture is at the periphery of the bottom than when it is at the centre. Accordingly in order to enable the same minimum size of particle to be detected anywhere on the bottom of the bottle the width of the slit may increase from the centre towards the periphery as shown in Figure 9, so as to permit the amount of light reaching the aperture in the moving screen to increase as the aperture moves from the centre towards the periphery. In such constructions the aperture will have a width substantially equal to the maximum width of the slit.

For example in the construction shown in Figs. 1 to 3 the sides of the slit 11 may be not concentric circular arcs, but, as shown diagrammatically in Fig. 10 may be curved, diverging to substantially equal extents from the arcuate centre line from the centre towards the periphery of the platform so that the slit is wider at the outer end than at the inner end, the diameter of the aperture 31 being equal to the maximum width of the slit 11.

By this means the effective width of the aperture 31 is increased as it travels from the centre to the periphery of the bottle bottom and reduced as it travels in the reverse direction thereby compensating for the variation in the light transmission value of the bottle bottom, due to convexity thereof.

Similarly in the construction shown in Figs. 4 to 8 the sides of the slit 66 may be slightly curved and diverge substantially equally on both sides of the centre line from the centre towards the periphery of the platform, forming substantially a very acute angled triangle with curved sides, as shown in Fig. 9.

I claim:

1. Apparatus for scanning the bottom of a transparent vessel to detect foreign bodies thereon, comprising in combination a source of light, a photo-electric device, a movable assembly including a support for a vessel to be scanned and means for locating a vessel in scanning position thereon, a first screen disposed below the bottom of the vessel when said vessel is so located and provided with an aperture having an area small relative to that of the bottom of the vessel, a second screen provided with a slit which is disposed substantially radially of the vessel bottom when the vessel is in scanning position, the width of said slit being at least equal to the width of said aperture, said first and second screens being disposed between the source of light and the photo-electric device, means for rotating a vessel about its longitudinal axis relatively to said support, and a fixed cam about which said assembly is rotatable, said cam being arranged to effect relative movement between said first and second screens so as to transverse the aperture along the slit as the vessel rotates.

2. Apparatus according to claim 1 wherein the photo-electric device is in the form of a photocell mounted for movement with the movable assembly whereby the light passing through the aperture in said screen always falls on the same area of the cell cathode, thus obviating variations in the sensitivity of the apparatus due to variations in the sensitivity of different areas of the cathode.

3. Apparatus according to claim 1, wherein the support comprises the second screen having the slit formed therein.

4. Apparatus for scanning the bottom of a transparent vessel to detect foreign bodies thereon, comprising in combination a source of light, a photo-electric device, and a movable assembly including a support for a vessel to be scanned and means for locating a vessel in scanning position thereon, a first screen mounted on said assembly and disposed below the bottom of the vessel when said vessel is so located and provided with an aperture having an area small relative to that of the bottom of the vessel, said support comprising a second screen provided with a slit which is disposed substantially radially of the vessel bottom when the vessel is in scanning position, the width of said slit being at least equal to the width of said aperture, said first and second screens being disposed between the source of light and the photo-electric device, means for rotating a vessel about its longitudinal axis relatively to said support and a fixed cam about which said assembly is rotatable, said cam being arranged to effect relative movement between said first and second screens so as to traverse the aperture along the slit as the vessel rotates.

5. Apparatus for scanning the bottom of a transparent vessel to detect foreign bodies thereon, comprising in combination a source of light, a photo-electric device, and a movable assembly including a support for a vessel to be scanned and means for locating a vessel in scanning position thereon, a first screen disposed below the bottom of the vessel when said vessel is so located and provided with an aperture having an area small relative to that of the bottom of the vessel, a second screen provided with a slit which is disposed substantially radially of the vessel bottom when the vessel is in scanning position, the width of said slit varying along its length in a direction extending from the centre to the periphery of a vessel disposed in scanning position and having a maximum width substantially equal to the width of the said aperture, said first and second screens being disposed between the source of light and the photo-electric device, means for rotating a vessel about its longitudinal axis relatively to said support and a fixed cam about which said assembly is rotatable, said cam being arranged to effect relative movement between said first and second screens so as to traverse the aperture along the slit as the vessel rotates.

6. Apparatus for scanning the bottom of a transparent vessel to detect foreign bodies thereon, comprising in combination a source of light, a photo-electric device, and a movable assembly including a support for a vessel to be scanned and means for locating a vessel in scanning position thereon, a first screen mounted on said assembly and disposed below the bottom of the vessel when said vessel is so located and provided with an aperture having an area small relative to that of the bottom of the vessel, said support comprising a second screen provided with a slit which is disposed substantially radially of the vessel bottom when the vessel is in scanning position, the width of said slit varying along its length in a direction extending from the centre to the periphery of a vessel disposed in scanning position and having a maximum width substantially equal to the width of the said aperture, said first and second screens being disposed between the source of light and the photo-electric device, means for rotating a vessel about its longitudinal axis relatively to said support and a fixed cam about which said assembly is rotatable, said cam being arranged to effect relative movement between said first and second screens so as to traverse the aperture along the slit as the vessel rotates.

7. Apparatus according to claim 1, wherein the first screen comprises a tube surrounding the photo-electric device.

8. Apparatus according to claim 1, wherein the first screen comprises a first tube surrounding the photo-electric device and the second screen comprises a second tube surrounding and concentric with said first tube.

NORMAN PARKER STOATE.

REFERENCES CITED

The following references are of record in the file of this patent:

UNITED STATES PATENTS

| Number | Name | Date |
|---|---|---|
| 2,100,227 | Stoate et al. | Nov. 23, 1937 |
| 2,267,961 | Tillyer et al. | Dec. 30, 1941 |